(12) United States Patent
Yen

(10) Patent No.: US 6,495,292 B1
(45) Date of Patent: Dec. 17, 2002

(54) WETTABLE NONWOVEN BATTERY SEPARATOR

(76) Inventor: William W. Yen, 51 Alton St., Arlington, MA (US) 02474

( * ) Notice: Subject to any disclaimer, the term of this patent is extended or adjusted under 35 U.S.C. 154(b) by 15 days.

(21) Appl. No.: 09/694,989

(22) Filed: Oct. 24, 2000

Related U.S. Application Data

(60) Provisional application No. 60/200,021, filed on Apr. 26, 2000.

(51) Int. Cl.$^7$ ................................................. H01M 2/16
(52) U.S. Cl. ..................... 429/249; 429/247; 429/142; 429/144; 429/145
(58) Field of Search ............................... 429/249, 247, 429/142, 144, 145

(56) References Cited

U.S. PATENT DOCUMENTS

| | | |
|---|---|---|
| 4,699,857 A | 10/1987 | Giovannoni et al. |
| 5,089,360 A | 2/1992 | Kanno et al. |
| 5,171,647 A | 12/1992 | Dean et al. |
| 5,202,178 A | 4/1993 | Turner |
| 5,401,594 A | 3/1995 | Schwobel et al. |
| 5,631,102 A | 5/1997 | Spillman et al. |
| 5,942,354 A | 8/1999 | Oxley et al. |
| 6,051,335 A | 4/2000 | Dinh-Sybeldon et al. |
| 6,284,680 B1 * | 9/2001 | Aikawa et al. ............. 442/340 |

FOREIGN PATENT DOCUMENTS

| | | | |
|---|---|---|---|
| JP | 2-10654 | * | 1/1990 |
| JP | 5-121063 | * | 5/1993 |

* cited by examiner

*Primary Examiner*—Laura Weiner
(74) *Attorney, Agent, or Firm*—Samuels, Gauthier & Stevens, LLP

(57) ABSTRACT

A nonwoven battery separator which comprises a nonwoven, the nonwoven formed from a plurality of fibers and at least one high solubility parameter polymer, which polymer forms an encapsulation sheath around the fibers. The encapsulation sheath optionally has pores of about one micron or less and the separator is characterized in that it has a surface pore size of at least five microns.

10 Claims, 2 Drawing Sheets

Sheath of high solubility parameter polymer around the polyolefin fibers.
The coating will bind fibers at the joint.

Surface porosity and inorganic fillers on the sheath.

Coated Nonwoven Structure

Sheath of high solubility parameter polymer around the polyolefin fibers.
The coating will bind fibers at the joint.

Surface porosity and inorganic fillers on the sheath.

WETTABLE NONWOVEN BATTERY SEPARATOR

CROSS-REFERENCE TO RELATED APPLICATIONS

This application claims the benefit of U.S. Provisional Application No. 60/200,021, filed Apr. 26, 2000.

BACKGROUND OF THE INVENTION

1. Field of the Invention

The present invention relates to battery separators and more particularly to wettable nonwoven battery separators.

2. Description of the Related Art

Non-woven separators are currently being used in many primary (i.e. non-rechargeable) and secondary (i.e. rechargeable) battery systems. The majority of the nonwovens are made from polyamide, polyvinyl alcohol (PVA) and cellulose fibers. In general nonwovens made from polyamide and polyvinyl alcohol (PVA) are high in cost and all of the materials mentioned will degrade on specific storage conditions. U.S. Pat. No. 5,700,600 discloses that cellulose and PVA non-woven separators will only retain 41% and 56% respectively of their original tensile strength on storage in a 40% KOH solution for a period of 14 days. When polyamide is used in a secondary cell, the degradation of the polyamide polymer creates a "self-discharge" phenomenon in the cell. This is commonly known as the "nitrate-nitrite shuttle", Falk & Salkind, *Alkaline Storage Batteries*, 1969.

Battery manufacturers have started to use polyolefin nonwovens as battery separators but the problems of using polyolefin nonwovens as battery separators are well known in the art. The problems include the lack of long term wettability and the instability of the nonwoven separators.

Grafting procedures have been developed to make the polyolefin wettable. U.S. Pat. No. 5,830,604 discloses the grafting of carboxylic groups onto a hydrocarbon chain of polyolefin. However, this procedure is inefficient and costly.

U.S. Pat. No. 5,700,600 discloses the coating of a cellulose "film" on at least one surface of a noncellulosic nonwoven substrate. This allows the composite of cellophane and nonwoven to absorb electrolyte, however, the barrier film impedes the migration of electrolyte between the battery electrodes.

U.S. Pat. No. 5,389,433 discloses a microporous sheet product having a fibrous sheet of nonwoven "embedded" in a polysulfone composite. However, the continuous microporous sheet lacks the large nonwoven pore structure thereby preventing the free flow of electrolyte between the battery electrodes.

The present invention provides a battery separator and method for making the same which resolves the long-term wettability issue of a polyolefin nonwoven while preserving the long term structural stability of the polyolefin separator.

BRIEF DESCRIPTION OF THE INVENTION

Broadly, this invention comprises a nonwoven battery separator which is cost efficient to manufacture, is stable and provides long term wettability.

The nonwoven battery separator of the invention comprises a nonwoven formed from a plurality of fibers and at least one high solubility parameter polymer, which polymer forms an encapsulation sheath around the fibers. The encapsulation sheath optionally has pores of about one micron or less. The separator is characterized in that it has a surface pore size of at least five microns.

The invention also comprises a method for producing a nonwoven battery separator which comprises encapsulating a nonwoven with a high solubility parameter polymer by immersing the nonwoven in the high solubility parameter polymer to form a nonwoven having an encapsulation sheath and coagulating the encapsulation sheath to form the nonwoven battery separator. The method is characterized in that the formed encapsulation sheath optionally has pores of about one micron or less and the formed battery separator has a surface pore size of at least five microns.

As opposed to the slow speed of radiation and chemical grafting of nonwovens, the encapsulation of nonwovens with a high solubility parameter polymer can be carried out at a relatively high speed. The projected line speed for a 0.1 mil coating of viscose (the liquid predecessor of cellophane) can be as high as 150 feet/min. A coating of polysulfone solution can also be processed at a relatively high line speed.

The nonwovens used for this application can be made from polyethylene, polypropylene polyester and polyamide. The nonwoven may be produced by a single polymer type or from a blend of polymers. Polyvinyl alcohol and cellulose fibers may be used as a component of the nonwoven blend. The nonwoven may be multi-layered, for example, nonwoven polypropylene coupled with a nonwoven polyester or spunbonded polypropylene on melt blown polyethylene on spunbonded polypropylene. The high solubility parameter polymers used for this application are cellulose, polysulfone, polyvinyl alcohol, polyvinyl chloride, polyamide, epoxy and phenolic resins. Further, when polyvinyl alcohol is used, the polyvinyl alcohol can be cross-linked to reduce the inherent water solubility. The high solubility parameter polymer treated nonwoven may be coupled with non-treated nonwovens.

The cellulose treatment of the nonwoven can be made by a variety of procedures, such as viscose, cuprammonium, N-methyl-morpholine-n-oxide and zinc chloride. The cellulosic coating may include derivatized cellulose, such as methylcellulose and sodium carboxymethylcellulose.

In a preferred embodiment of the invention, the high solubility parameter polymer has a solubility parameter above 9, as defined by $\delta=((\Delta H-RT)/(M/D))^{1/2}$ or $\delta=DG/M$.

$\delta$=Solubility parameter, $(cal/sec)^{1/2}$

D=Density

G:=Summation of molar attraction constants

M=Molecular weight

R. Deanin, *Polymer Structure, Properties and Applications*, 1972.

In yet another aspect of the invention, inorganic fillers can be added as part of the encapsulation sheath to improve the wettability of the nonwoven. The inorganic fillers that can be used in this application are silica ($SiO_2$), talc ($Mg_2SiO_4$), aluminum oxide, hydrated alumina, titanium oxide, zirconium oxide and sodium silicate. In a particularly preferred embodiment of the invention, the concentration range of the inorganic filler in the encapsulation sheath is between about 0 to 50% based on weight.

The open structure of the nonwoven separator is largely intact after the treatment. The cross-joints of the fibers are also surrounded by the high solubility parameter polymer which adds support and strength to the nonwoven. Certain small pores of the nonwoven may be filled by the high solubility parameter polymer from the treatment.

In a particularly preferred embodiment of the invention, a cellophane-like sheath around the polyolefin fiber can absorb electrolyte in a cell. Cellophane material has a pore size generally about 50 angstroms, and a wet porosity of typically below 70%.

In an alternative embodiment of the invention, a polysulfone membrane-like sheath covering the polyolefin fiber will provide surface porosity which can absorb electrolyte in a cell. The polysulfone membrane-like sheath will generally have pore size below one micron and a porosity typically below 70%. Both the cellophane and polysulfone sheath will absorb electrolyte through capillary action.

The nonwoven separator of the invention is wettable and absorbs electrolyte during the assembly of a cell. During the discharge life of the cell, the electrolyte in the cell can be consumed by electrochemical reaction. The nonwoven separator of the invention has the ability to "release" free electrolytes in the nonwoven while the encapsulation sheath retains electrolytes through capillary action thereby prolonging the cell life. The wettable and microporous sheath on the nonwoven fiber will allow ions to be transported between the electrodes even when the "large pores" of the nonwoven dries.

BRIEF DESCRIPTION OF THE DRAWING(S)

DESCRIPTION OF THE PREFERRED EMBODIMENT(S)

Figure 1:
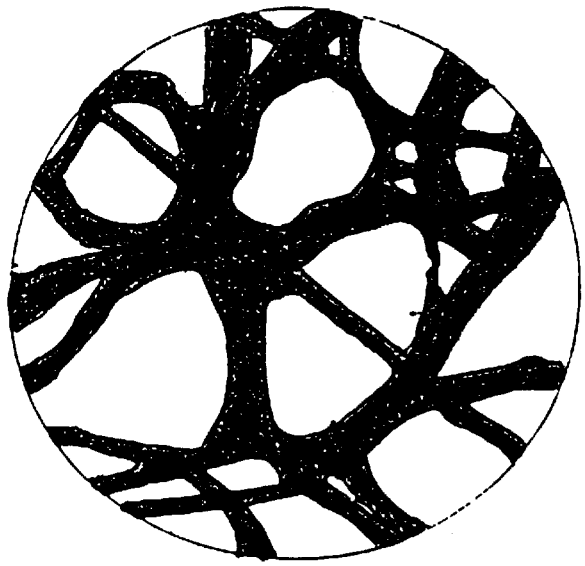
FIG. 1 is a drawing which depicts the coated nonwoven structure of the invention.
Figure 2:
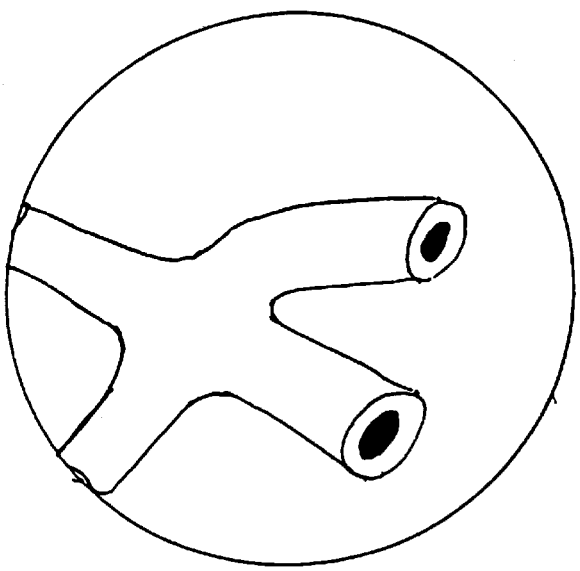
FIG. 2 is a cross-sectional perspective view of the encapsulation sheath.
Figure 3:
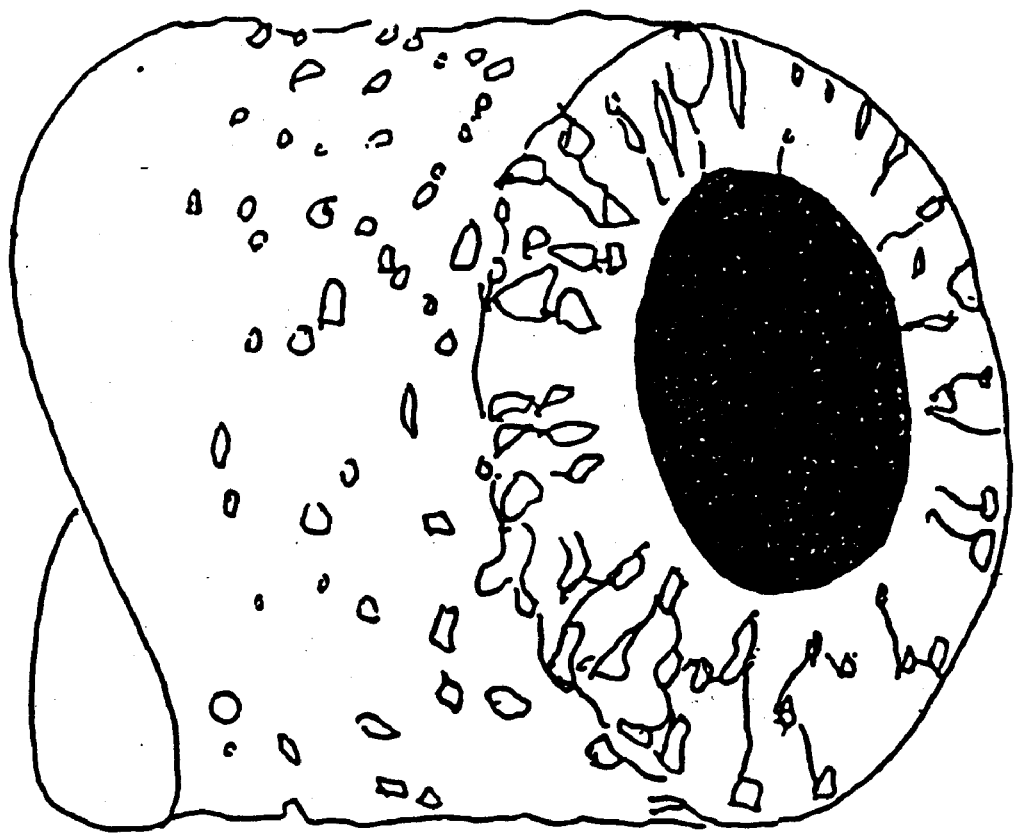
FIG. 3 is a drawing which depicts the surface porosity and inorganic fillers on the encapsulation sheath.

The invention will be described with reference to the following non-limiting examples.

The separator of the invention has applications as a battery separator, membrane, filter, wipe, apparel interlining and moisture "breathable" disposable gown or bed sheet. Further, the separator is heat sealable (as in forming a separator envelop to contain an electrode) in the battery.

The separator of the invention generally has the following properties:

The nonwovens of the separator preferably have air permeability between 1 to 200 CFM per foot square as measured by ASTM D-737-96.

The nonwovens of the separator may be produced from the processes of wet forming, dry forming, melt blown or spun-bonded or other processes known in the art. The nonwoven fibers having a fiber diameter from about 1 to 30 microns, more preferably from 5 to 15 microns.

The encapsulation sheath of the separator has a degree of polymerization of at least 100, more preferably at least 500; the cellulose material can be comprised of at least 90% of α-cellulose, more preferably 98% of α-cellulose based upon the total weight of cellulose materials such as wood pulp or cotton; and encapsulation sheath around the fiber has a thickness of less than 5 microns.

The separator has a wicking rate of at least 5 mm per 5 minutes as measured by ASTM D-202-97, Absorption (Rise of Water) test; an electrolyte (or 30% KOH) absorption of at least 100% per dry basis weight or 30 grams per meter square as measured by ASTM D-4250-92 (where the sample is allowed to freely immersed in liquid for 10 minutes, drip-dried for 30 seconds for the measured absorption instead of using the Specimen Holder and Extractor described); has at least 10% by weight of the "sheath" polymeric material, preferably 50% by weight; has a separator resistance below 400 milliohm-cm.sq., or below 100 ohm-cm in resistivity; has a thickness of 1 to 50 mils; has a basis weight between 10 to 300 grams per meter square; and has a tensile strength above. 400 psi as measured by ASTM D-882-97 both in the machine (MD) and cross machine (CMD) direction.

The sheath (high solubility parameter polymeric) material may include additives such as plasticizers, surfactants, sizing agents and processing aids. The amount of the additive is typically less than 10% by weight, preferably less than 5% by weight.

In the preferred embodiment of the invention the separators of the invention are generally made by immersing a polyolefin nonwoven in a cellulose viscose solution. The starting material is generally cotton or wood-pulp. It is saturated in an 18% sodium hydroxide solution to swell the cellulose structure. The wood-pulp is subsequently reacted with carbon disulfide to form a paste, named "viscose". The viscose is aged (or ripened) prior to the actual "regeneration" of the cellulose. To achieve the encapsulation of polyolefin fiber, the polyolefin nonwoven is immersed in the viscose solution. The excess viscose between the fibers is removed, thus leaving large openings between the nonwoven fibers while the individual fibers are uniformity coated with a surrounding of viscose. The viscose treated nonwoven is then immersed in a 20 weight percent sodium sulfate and 2 weight percent sulfuric acid solution to coagulate the cellulose structure. The next step is to regenerate the coagulated cellulose by react the material with a 10 weight percent of sulfuric acid solution. The "wet cellulose" structure is subsequently washed and dried. This process is more specifically described in the following example:

EXAMPLE 1

A cellulose viscose solution is prepared by soaking 5.0 grams of cotton cellulose in an 18 weight percent of NaOH solution for one week. After one week of storage, the excess NaOH solution is pressed out. The remaining cellulose is treated with a 1.8 grams dose of carbon disulfide ($CS_2$). The mixture of cotton and $CS_2$ is mixed in an ice bath for 2 hours. A final addition of 45 grams of 7 weight percent of NaOH solution is added to the xanthate cellulose to dilute the cellulose concentration. The result is a 10% cellulose viscose. To regenerate the cellulose, a coagulation bath of 7.5% $Na_2SO_4$ and 7.5% sulfuric acid is prepared. The final regeneration bath was a 15% sulfuric acid bath.

The base polypropylene nonwoven used for the cellulose treatment has a basis weight of 20 grams per meter square, and a thickness of 5 mils, made by Kimberly Clark Inc. A sheet of polypropylene nonwoven is immersed in the viscose solution. The viscose saturated nonwoven is subsequently placed on a piece of glass, with the excess viscose squeegeed off by a Gardner clipper set at 4 mils. The nonwoven is subsequently treated with the coagulation bath, the regeneration bath and water washed.

The resulting cellulose treated polypropylene nonwoven has a basis weight of 36 grams per meter square. The final dry thickness is 6.5 mils. The wet thickness is 7.6 mils. The electrolyte (30% NaOH solution) wicking rate is 30 mm in one minute. The wet-out of the treated polypropylene nonwoven by electrolyte is less than one second. The resistance of the separator was 140 milliohm-$cm^2$ (in 30% NaOH), with the resistivity being 7.2 ohm-cm. When viewed under a microscope, the treated nonwoven has the distinct features of a nonwoven, where individual fibers are separated and the pores between the fibers are visible. The polypropylene fibers are encapsulated by the cellulose-sheath. The cellulose can also adhere to the adjoining polypropylene fibers. The visible nonwoven pore size is between about 10 to 30 microns.

EXAMPLE 2

The viscose solution in Example 1 is further diluted with a 7% NaOH solution. The result is a 5% cellulose viscose. After the immersion of the nonwoven polypropylene in viscose, the excess viscose is removed by the squeegee method. The cellulose is regenerated by treating the nonwoven in the coagulation bath, subsequently the regeneration bath and water washed. The resulting nonwoven has a dry thickness of 5.5 mils. The wet thickness is 5.3 mils. The basis weight of the treated nonwoven is 31 grams per meter square. The 30% NaOH wicking rate is 24 mm in one minute. The wet-out of the treated polypropylene nonwoven by electrolyte is less than one second. The resistance of the separator is 32 milliohm-cm$^2$, with the resistivity being 2.1 ohm-cm (in 30% KOH). The nonwoven pore size is between about 10 to 30 microns under the microscope.

EXAMPLE 3

An epoxy solution is prepared by dissolving 0.8 gram of epoxy resin and 0.8 gram of hardener (triethylene tetramine and polymercaptan) in 30 grams of acetone. The base polypropylene nonwoven used for the epoxy treatment has a basis weight of 40 grams per meter square, and a thickness of 10 mils, made by Kimberly Clark Inc. After the immersion of the nonwoven polypropylene in the epoxy solution, the excess solution was dripped dried. The nonwoven was subsequently cured with a hot air dryer and water washed. The resulting nonwoven has a dry thickness of 12.5 mils and a wet thickness of 12.5 mils. The basis weight of the treated nonwoven was 46 grams per meter square. The electrolyte absorption was 336 grams per meter square. The wet-out of the treated polypropylene nonwoven by electrolyte was 32 seconds. The resistance of the separator was 72 milliohm-cm$^2$, with the resistivity being 2.3 ohm-cm in 30% KOH. The nonwoven pore size is between about 10 to 30 microns under the microscope.

In an alternative embodiment of the invention, the separators of the invention can be made by treating a polyolefin nonwoven with polysulfone. The treatment of the polyolefin nonwoven with polysulfone is initiated through the preparation of a polysulfone solution. The polysulfone is first dissolved in a solvent, such as methylene chloride. The nonwoven is subsequently immersed in the polysulfone solution, the excess polysulfone solution is removed, the polysulfone is coagulated in an alcohol bath and finally dried. The resulting nonwoven will have a coating of polysulfone on the nonwoven fibers while the nonwoven pore structure remains "open". The solid polysulfone polymer can be dissolved in a primary solvent of chloroform, methylene chloride and dimethylformanide. A co-solvent (or pore former) such as polyvinyl pyrrolidone, polyethylene oxide, polyethylene glycol, glycerin or surfactant can also be used. The coagulation bath can be a combination of water, alcohol or ketone.

The high solubility parameter polymer may be applied onto the nonwoven by spraying, immersion, saturation or coating via slit or annular die, on one or multiple surfaces.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention, what I now claim is:

1. A nonwoven battery separator which comprises:
   a nonwoven formed from a plurality of fibers; and
   at least one high solubility parameter polymer, which polymer forms an encapsulation sheath around the fibers, the encapsulation sheath comprised of pores, each pore having a pore size of about less than one micron, the battery separator characterized in that it has a surface pore size of at least five microns.

2. A battery separator according to claim 1 wherein the nonwoven is selected from the group consisting of polyethylenes, polypropylenes, polyesters and polyamides.

3. A battery separator according to claim 1 wherein the polymer is selected from the group consisting of cellulose, polysulfone, polyvinyl alcohol, polyvinyl chloride, polyamide, epoxy and phenolic resins.

4. The battery separator according to claim 1 which further comprises:
   an inorganic filler selected from the group consisting of silica, talc, aluminum oxide, hydrated alumina, titanium oxide, zirconium oxide and sodium silicate.

5. The battery separator according to claim 1 wherein the polymer has a solubility parameter above 9.

6. A nonwoven battery separator which comprises:
   a nonwoven formed from a plurality of fibers; and
   at least one high solubility parameter polymer selected from the group consisting of cellulose, polysulfone, polyvinyl alcohol, polyvinyl chloride, epoxy and phenolic resins, which polymer forms an encapsulation sheath around the fibers, the encapsulation sheath comprised of pores, each pore having a pore size of about less than one micron, the battery separator characterized in that it has a surface pore size of at least five microns.

7. The separator of claim 6 wherein the polymer has a solubility parameter above 9.

8. A nonwoven battery separator which comprises:
   a nonwoven formed from a plurality of fibers;
   an inorganic filler selected from the group consisting of silica, talc, aluminum oxide, hydrated alumina, titanium oxide, zirconium oxide and sodium silicate; and
   at least one high solubility parameter polymer, which polymer forms an encapsulation sheath around the fibers, the encapsulation sheath comprised of pores, each pore having a pore size of about less than one micron, the battery separator characterized in that it has a surface pore size of at least five microns.

9. The battery separator according to claim 8 wherein the nonwoven is selected from the group consisting of polyethylenes, polypropylenes, polyesters and polyarnides.

10. A battery separator according to claim 9 wherein the polymer is selected from the group consisting of cellulose, polysulfone, polyvinyl alcohol, polyvinyl chloride, polyamide, epoxy and phenolic resins.

\* \* \* \* \*

UNITED STATES PATENT AND TRADEMARK OFFICE
CERTIFICATE OF CORRECTION

PATENT NO.    : 6,495,292 B1
DATED         : December 17, 2002
INVENTOR(S)   : William W. Yen It is certified that error appears in the above-identified patent and that said Letters Patent is hereby corrected as shown below:

Column 6,
Line 57, please delete "polyarnides" and insert therefor -- polyamides --.

Signed and Sealed this

Twenty-fifth Day of February, 2003

JAMES E. ROGAN
*Director of the United States Patent and Trademark Office*